United States Patent
Nagahashi

(10) Patent No.: US 7,995,866 B2
(45) Date of Patent: Aug. 9, 2011

(54) ROTATION ANGLE DETECTION APPARATUS, AND CONTROL METHOD AND CONTROL PROGRAM OF ROTATION ANGLE DETECTION APPARATUS

(75) Inventor: Toshinori Nagahashi, Tatsuno (JP)

(73) Assignee: Seiko Epson Corporation (JP)

( * ) Notice: Subject to any disclaimer, the term of this patent is extended or adjusted under 35 U.S.C. 154(b) by 951 days.

(21) Appl. No.: 11/869,141

(22) Filed: Oct. 9, 2007

(65) Prior Publication Data

US 2008/0089588 A1 Apr. 17, 2008

(30) Foreign Application Priority Data

Oct. 11, 2006 (JP) ................................. 2006-277185

(51) Int. Cl.
*G06K 9/40* (2006.01)
(52) U.S. Cl. ......... 382/296; 382/274; 382/275; 382/297
(58) Field of Classification Search .................. 382/289, 382/291, 296, 297
See application file for complete search history.

(56) References Cited

U.S. PATENT DOCUMENTS

| | | | | |
|---|---|---|---|---|
| 5,393,962 A | * | 2/1995 | Konishi et al. ................ 235/375 |
| 5,430,548 A | * | 7/1995 | Hiroi et al. ................... 356/394 |
| 5,748,347 A | * | 5/1998 | Erickson ......................... 359/23 |
| 5,793,901 A | * | 8/1998 | Matsutake et al. ............ 382/294 |
| 6,201,880 B1 | * | 3/2001 | Elbaum et al. ................ 382/100 |
| 6,650,763 B2 | * | 11/2003 | Echizen et al. ................ 382/100 |
| 6,964,009 B2 | * | 11/2005 | Samaniego et al. ........... 715/202 |
| 6,990,249 B2 | * | 1/2006 | Nomura ........................ 382/254 |
| 7,197,186 B2 | | 3/2007 | Jones et al. |
| 7,218,389 B2 | * | 5/2007 | Uto et al. ................... 356/237.2 |

FOREIGN PATENT DOCUMENTS

| | | |
|---|---|---|
| JP | 3454726 | 7/2003 |
| JP | 2006-59215 | 3/2006 |
| WO | WO2004-111867 | 12/2004 |

\* cited by examiner

*Primary Examiner* — Yosef Kassa
(74) *Attorney, Agent, or Firm* — Harness, Dickey & Pierce, P.L.C.

(57) ABSTRACT

A rotation angle detection apparatus which detects a rotation angle with respect to a reference disposition position of an object included in a detection subject image, includes: a plurality of kinds of pixel extraction pattern for extracting a plurality of pixels which detect an image feature amount from pixels configuring the detection subject image; a feature amount detector which detects, for each pixel extraction pattern, an image feature amount of the extracted plurality of pixels; a likelihood memory which stores a likelihood of the rotation angle, correlated in advance to the image feature amount, for each pixel extraction pattern; and a rotation angle determiner which determines a rotation angle which has a greatest likelihood, based on the image feature amount corresponding to each pixel extraction pattern and on the likelihood, as the rotation angle of the object.

9 Claims, 15 Drawing Sheets

LUMINANCE DIFFERENCE (QUANTIZED VALUE) 32A

| ROTATION ANGLE | −10 | ... | −5 | ... | 0 | ... | 5 | ... | 10 |
|---|---|---|---|---|---|---|---|---|---|
| 0 | 18/1000 | | 10/1000 | | 190/1000 | | 10/1000 | | 33/1000 |
| 5 | 34/1000 | | 13/1000 | | 45/1000 | | 13/1000 | | 47/1000 |
| ⋮ | ⋮ | | ⋮ | | ⋮ | | ⋮ | | ⋮ |
| 180 | 230/1000 | | 365/1000 | | 500/1000 | | 234/1000 | | 159/1000 |
| ⋮ | ⋮ | | ⋮ | | ⋮ | | ⋮ | | ⋮ |
| 350 | 25/1000 | | 10/1000 | | 10/1000 | | 89/1000 | | 54/1000 |
| 355 | 30/1000 | | 2/1000 | | 2/1000 | | 27/1000 | | 121/1000 |

LUMINANCE DIFFERENCE (QUANTIZED VALUE) 32B

| ROTATION ANGLE | −10 | ... | −5 | ... | 0 | ... | 5 | ... | 10 |
|---|---|---|---|---|---|---|---|---|---|
| 0 | 22/1000 | | 16/1000 | | 190/1000 | | 10/1000 | | 133/1000 |
| 5 | 57/1000 | | 31/1000 | | 45/1000 | | 74/1000 | | 347/1000 |
| ⋮ | ⋮ | | ⋮ | | ⋮ | | ⋮ | | ⋮ |
| 180 | 104/1000 | | 297/1000 | | 471/1000 | | 125/1000 | | 10/1000 |
| ⋮ | ⋮ | | ⋮ | | ⋮ | | ⋮ | | ⋮ |
| 350 | 138/1000 | | 10/1000 | | 10/1000 | | 23/1000 | | 88/1000 |
| 355 | 42/1000 | | 2/1000 | | 2/1000 | | 49/1000 | | 121/1000 |

ROTATION ANGLE DETECTION APPARATUS, AND CONTROL METHOD AND CONTROL PROGRAM OF ROTATION ANGLE DETECTION APPARATUS

BACKGROUND

1. Technical Field

The present invention relates to a rotation angle detection apparatus, and a control method and control program of the rotation angle detection apparatus, and particularly to a rotation angle detection apparatus, and a control method and control program of the rotation angle detection apparatus, for detecting a rotation angle (a rotation angle within a two-dimensional image plane) of an object such as a person's facial image in a detection subject image.

2. Related Art

To date, a detection of a person's face has been carried out assuming a variety of applications, such as an identification photograph or a management of entering and leaving a room by means of a facial recognition.

For example, with the identification photograph, a position in the photograph, a size, a direction of a face, and the like, are stringently fixed.

Also, although a variety of facial detection and facial recognition technologies are known, they are carried out under a precondition that the face is in an upright condition.

As such, it can be easily understood that detecting the direction of the face, and correcting it perpendicularly, has a considerable effect on a widening of the applications, and an accuracy of the facial detection and facial recognition.

As this kind of technology, a technology which, calculating reference parameters from a center of a flesh color area and feature points of the face, detects a rotation angle (an inclination) on an image plane of the face, is disclosed in Japanese Patent No. 3,454,726.

However, depending on differences in skin color caused by differences in race, and lighting conditions, a range of apparent colors changes considerably. Also, depending on an orientation of the face too, the range of the apparent colors has changed considerably.

As a result, with the heretofore described related art, there has been a problem in that it is not always possible to detect an accurate rotation angle of the object.

SUMMARY

An advantage of some aspects of the invention is to provide a rotation angle detection apparatus, and a control method and control program of the rotation angle detection apparatus, capable of reducing an effect of a skin color and lighting, and detecting a rotation angle of an object easily and quickly.

A rotation angle detection apparatus according to an aspect of the invention which detects a rotation angle with respect to a reference disposition position of an object included in a detection subject image includes: a plurality of kinds of pixel extraction pattern for extracting a plurality of pixels which detect an image feature amount from pixels configuring the detection subject image; a feature amount detector which detects, for each pixel extraction pattern, an image feature amount of the extracted plurality of pixels; a likelihood memory which stores a likelihood of the rotation angle, correlated in advance to the image feature amount, for each pixel extraction pattern; and a rotation angle determiner which determines a rotation angle which has a greatest likelihood, based on the image feature amount corresponding to each pixel extraction pattern and on the likelihood, as the rotation angle of the object.

According to the heretofore described configuration, the feature amount detector detects, for each pixel extraction pattern, the image feature amount of the extracted plurality of pixels.

By this means, the rotation angle determiner determines the rotation angle which has the greatest likelihood, based on the image feature amount corresponding to each pixel extraction pattern and on the likelihood stored in the likelihood memory, as the rotation angle of the object.

Consequently, it is possible, based on the image feature amount (for example, a luminance difference) and the greatest likelihood, to determine and detect the rotation angle of the object easily and quickly.

In this case, it is preferable to arrange in such a way that the likelihood memory quantizes the image feature amount in a plurality of steps, and stores the likelihood for each step and for each predetermined rotation angle.

According to the heretofore described configuration, limiting an enlargement of a memory capacity, a process acceleration is achieved.

Also, it is preferable to arrange in such a way that the rotation angle determiner, adding likelihoods corresponding to all the pixel extraction patterns for each predetermined rotation angle, generates a cumulative likelihood, and determines the predetermined rotation angle for which the cumulative likelihood is highest as the rotation angle of the object.

According to the heretofore described configuration, an increase of a reliability of a determination result is achieved with a simple process.

Furthermore, it is preferable to arrange in such a way that the image feature amount is a luminance difference of luminances which, when a pixel area configured of the plurality of pixels which detect the image feature amount is divided into two pixel areas, represent each pixel area.

According to the heretofore described configuration, even in a kind of case in which the object is a person's facial image, it is possible, reducing the effect of the differences in skin color caused by the race, or of the lighting conditions, to detect the rotation angle of the object more reliably.

Further still, it is preferable to arrange in such a way that the rotation angle detection apparatus further includes: an integral image generator which, integrating luminance values of all pixels within a rectangle having as diametrically opposed apices a predetermined reference position pixel and a subject pixel, and making them an integrated pixel value corresponding to the subject pixel, calculates an integrated pixel value corresponding to all the pixels configuring the detection subject image, and generates an integral image, and that the feature amount detector detects the image feature amount based on the integral image.

According to the heretofore described configuration, it is possible to detect the image feature amount quickly with a simple calculation.

Also, it is preferable to arrange in such a way that the rotation angle detection apparatus further includes: a resizing processor which, by carrying out a resizing of an immediately preceding detection subject image or a resizing of an immediately preceding pixel extraction pattern, and generating a current detection subject image or a current pixel extraction pattern, carries out a change of relative sizes of the detection subject image and the pixel extraction pattern.

According to the heretofore described configuration, by carrying out the change of the relative sizes of the detection subject image and the pixel extraction pattern every time, it is possible to cause the detection of the rotation angle of the object, without making a memory capacity necessary for the resizing process any larger than necessary.

Also, the rotation angle detection apparatus further includes: an extraction pattern generator which generates a plurality of kinds of original pixel extraction pattern; a likelihood calculator which, based on a plurality of sample images for which the original pixel extraction patterns and rotation angles are already known, calculates a likelihood for each rotation angle; and an extraction pattern selector which, based on a fluctuation of the calculated likelihoods, selects original pixel extraction patterns with higher fluctuations of the likelihood as the pixel extraction patterns.

According to the heretofore described configuration, the extraction pattern generator generates the plurality of kinds of original pixel extraction pattern.

By this means, the likelihood calculator calculates the likelihood for each rotation angle, based on the plurality of sample images for which the original pixel extraction patterns and rotation angles are already known, and the extraction pattern selector, based on the fluctuation of the calculated likelihoods, selects the original pixel extraction patterns with the higher fluctuations of the likelihood as the pixel extraction patterns.

Consequently, the extraction pattern selector being able to select a pixel extraction pattern effective for the rotation angle of the object based on the fluctuation of the likelihood, it is possible to more reliably detect the rotation angle.

Also, the rotation angle detection apparatus further includes: an extraction pattern generator which generates a plurality of kinds of original pixel extraction pattern; a likelihood calculator which, based on a plurality of sample images for which the original pixel extraction patterns and rotation angles are already known, calculates a likelihood for each rotation angle; and an extraction pattern selector which, based on sizes of the calculated likelihoods, selects original pixel extraction patterns with greater likelihoods as the pixel extraction patterns.

According to the heretofore described configuration, the extraction pattern generator generates the plurality of kinds of original pixel extraction pattern.

By this means, the likelihood calculator calculates the likelihood for each rotation angle, based on the plurality of sample images for which the original pixel extraction patterns and rotation angles are already known, and the extraction pattern selector, based on the sizes of the calculated likelihoods, selects the original pixel extraction patterns with the greater likelihoods as the pixel extraction patterns.

Consequently, the extraction pattern selector being able to select a pixel extraction pattern effective for the rotation angle of the object based on the size of the likelihood, it is possible to more reliably detect the rotation angle.

Also, the rotation angle detection apparatus further includes: an extraction pattern generator which generates a plurality of kinds of original pixel extraction pattern; a likelihood calculator which, based on a plurality of sample images for which the original pixel extraction patterns and rotation angles are already known, calculates a likelihood for each rotation angle; and an extraction pattern selector which, based on sizes of likelihoods calculated for identical rotation angles, selects original pixel extraction patterns with greater likelihoods as the pixel extraction patterns corresponding to the relevant rotation angles.

According to the heretofore described configuration, the extraction pattern generator generates the plurality of kinds of original pixel extraction pattern.

By this means, the likelihood calculator calculates the likelihood for each rotation angle, based on the plurality of sample images for which the original pixel extraction patterns and rotation angles are already known, and the extraction pattern selector, based on the sizes of the likelihoods calculated for the identical rotation angles, selects the original pixel extraction patterns with the greater likelihoods as the pixel extraction patterns corresponding to the relevant rotation angles.

Consequently, as the extraction pattern selector, based on the sizes of the likelihoods calculated for the identical rotation angles, selects the original pixel extraction patterns with the greater likelihoods as the pixel extraction patterns corresponding to the relevant rotation angles, it being possible to select a pixel extraction pattern effective for the rotation angle of the object, it is possible to more reliably detect the rotation angle.

Also, the rotation angle detection apparatus further includes: an extraction pattern generator which generates a plurality of kinds of original pixel extraction pattern; a likelihood calculator which, based on a plurality of sample images for which the original pixel extraction patterns and rotation angles are already known, calculates a likelihood for each rotation angle; and an extraction pattern selector which, for identical rotation angles, selects original pixel extraction patterns, from among a plurality of original pixel extraction patterns having the greatest likelihood, with a greater size of difference in sizes of the greatest likelihood and a likelihood corresponding to other rotation angles other than the identical rotation angles, as the pixel extraction patterns.

According to the heretofore described configuration, the extraction pattern generator generates the plurality of kinds of original pixel extraction pattern.

By this means, the likelihood calculator calculates the likelihood for each rotation angle, based on the plurality of sample images for which the original pixel extraction patterns and rotation angles are already known, and the extraction pattern selector selects, for the identical rotation angles, the original pixel extraction patterns, from among the plurality of original pixel extraction patterns having the greatest likelihood, with the greater size of difference in the sizes of the greatest likelihood and the likelihood corresponding to the other rotation angles other than the identical rotation angles, as the pixel extraction patterns.

Consequently, as the extraction pattern selector, based on a difference in sizes of a greatest likelihood obtainable for one rotation angle, and a likelihood in another rotation angle, selects original extraction patterns with a greater difference as the pixel extraction patterns corresponding to the relevant rotation angle, it being possible to select a pixel extraction pattern effective for the rotation angle of the object, it is possible to more reliably detect the rotation angle.

Also, a control method of a rotation angle detection apparatus which includes a likelihood memory which, in order to detect a rotation angle with respect to a reference disposition position of an object included in a detection subject image, stores a likelihood of the rotation angle, correlating it in advance to an image feature amount, for each pixel extraction pattern, includes: a feature amount detection process which detects, for a plurality of kinds of pixel extraction pattern for extracting a plurality of pixels which detect an image feature amount from pixels configuring the detection subject image, an image feature amount of the extracted plurality of pixels; and a rotation angle determination process which determines a rotation angle which has a greatest likelihood, based on the image feature amount corresponding to each pixel extraction pattern and on the likelihood, as the rotation angle of the object.

According to the heretofore described configuration, it is possible, based on the image feature amount (for example, the luminance difference) and the greatest likelihood, to determine and detect the rotation angle of the object easily and quickly.

In this case, it is preferable that the control method of the rotation angle detection apparatus further includes: an extraction pattern generation process which generates a plurality of kinds of original pixel extraction pattern; a likelihood calculation process which, based on a plurality of sample images for which the original pixel extraction patterns and rotation angles are already known, calculates a likelihood for each rotation angle; and an extraction pattern selection process which, based on a fluctuation of the calculated likelihoods, selects original pixel extraction patterns with higher fluctuations of the likelihood as the pixel extraction patterns.

According to the heretofore described configuration, it being possible to select a pixel extraction pattern effective for the rotation angle of the object, it is possible to more reliably detect the rotation angle.

In this case, it is also acceptable to arrange in such a way that the extraction pattern selection process selects the original pixel extraction patterns with the greater likelihoods as the pixel extraction patterns, based on the sizes of the calculated likelihoods, selects the original pixel extraction patterns with the greater likelihoods as the pixel extraction patterns corresponding to the relevant rotation angles, based on the sizes of the likelihoods calculated for the identical rotation angles, or selects, for the identical rotation angles, the original pixel extraction patterns, from among the plurality of original pixel extraction patterns having the greatest likelihood, with the greater size of difference in the sizes of the greatest likelihood and the likelihood corresponding to the other rotation angles other than the identical rotation angles, as the pixel extraction patterns.

Also, a control program for controlling, by means of a computer, a rotation angle detection apparatus which includes a likelihood memory which, in order to detect a rotation angle with respect to a reference disposition position of an object included in a detection subject image, stores a likelihood of the rotation angle, correlating it in advance to an image feature amount, for each pixel extraction pattern, includes: causing a detection, for a plurality of kinds of pixel extraction pattern for extracting a plurality of pixels which detect an image feature amount from pixels configuring the detection subject image for each pixel extraction pattern, of an image feature amount of the extracted plurality of pixels; and causing a determination of a rotation angle which has a greatest likelihood, based on the image feature amount corresponding to each pixel extraction pattern and on the likelihood, as the rotation angle of the object.

According to the heretofore described configuration, it is possible, based on the image feature amount (for example, the luminance difference) and the greatest likelihood, to determine and detect the rotation angle of the object easily and quickly.

In this case, the control program further includes: causing a generation of a plurality of kinds of original pixel extraction pattern; causing a calculation, based on a plurality of sample images for which the original pixel extraction patterns and rotation angles are already known, of a likelihood for each rotation angle; and causing a selection, based on a fluctuation of the calculated likelihoods, of original pixel extraction patterns with higher fluctuations of the likelihood as the pixel extraction patterns.

According to the heretofore described configuration, it being possible to select a pixel extraction pattern effective for the rotation angle of the object, it is possible to more reliably detect the rotation angle.

In this case, it is also acceptable to arrange in such a way as to, when selecting the pixel extraction patterns, cause a selection of the original pixel extraction patterns with the greater likelihoods as the pixel extraction patterns, based on the sizes of the likelihoods caused to be calculated, cause a selection of the original pixel extraction patterns with the greater likelihoods as the pixel extraction patterns corresponding to the relevant rotation angles, based on the sizes of the likelihoods caused to be calculated for the identical rotation angles, or cause a selection, for the identical rotation angles, of the original pixel extraction patterns, from among the plurality of original pixel extraction patterns having the greatest likelihood, with the greater size of difference in the sizes of the greatest likelihood and the likelihood corresponding to the other rotation angles other than the identical rotation angles, as the pixel extraction patterns.

BRIEF DESCRIPTION OF THE DRAWINGS

The invention will be described with reference to the accompanying drawings, wherein like numbers reference like elements.

FIG. 10 is an illustration of an example of an angle likelihood table corresponding to one pixel extraction pattern.

FIG. 11 shows an example of an angle likelihood table corresponding to another pixel extraction pattern.

DESCRIPTION OF EXEMPLARY EMBODIMENTS

Figure 1:
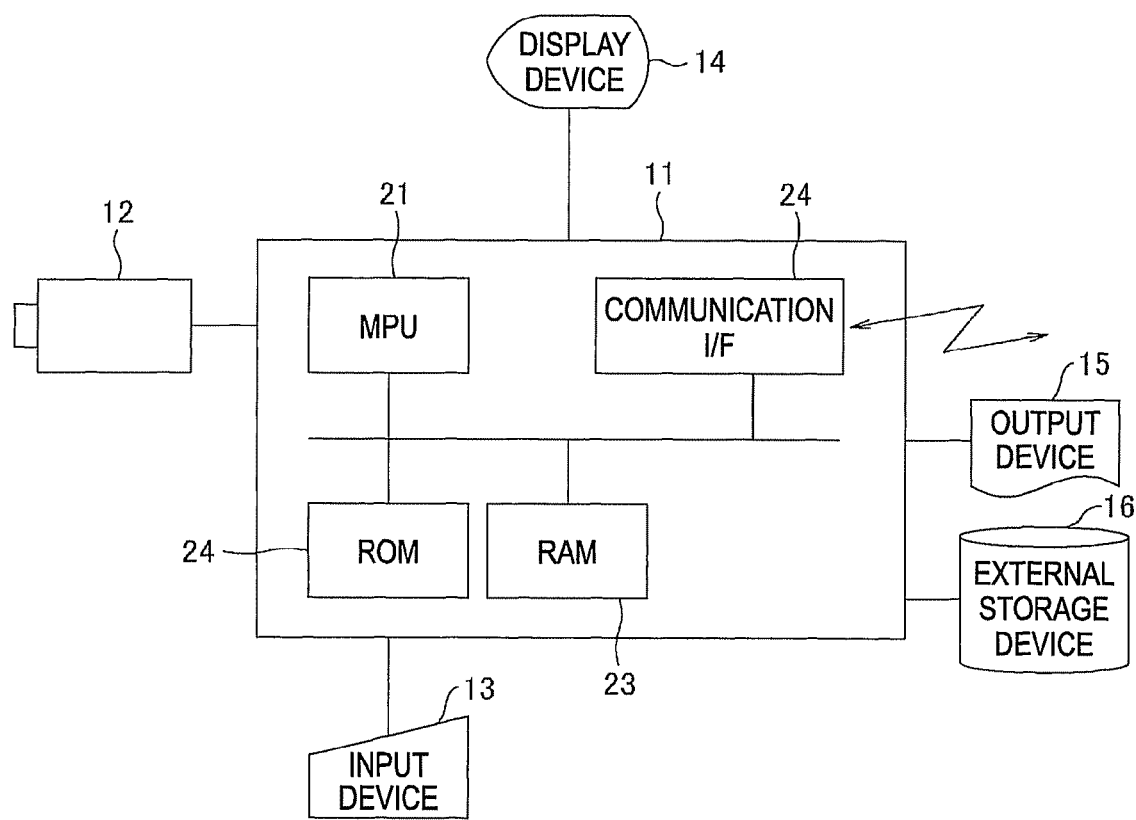
FIG. 1 is an outline configuration block diagram of an object detection apparatus of embodiments.

Next, a description will be given of preferred embodiments of the invention, referring to the drawings.

In the following description, a description will be given of a case in which, resizing a detection subject image (a resized image) with a size of a detection window for detecting a rotation angle of an object image as constant, a rotation angle of a person's facial image, which is the object image, is detected.

FIG. 1 is an outline configuration block diagram of a rotation angle detection apparatus of the embodiments.

A rotation angle detection apparatus 10, being configured as a personal computer, includes a detection apparatus main body 11, which carries out an object image rotation angle detection process, an imaging camera 12, which is an image input device, an input device 13, such as a keyboard or a mouse, for carrying out various operations, a display device 14, such as a liquid crystal display, which carries out various displays, an output device 15, such as a printer, which carries out a printing, and an external storage device 16, such as a hard disc device, which stores various kinds of data.

The detection apparatus main body 11 includes a microprocessor unit (MPU) 21, which carries out a control of a whole of the detection apparatus main body 11, an ROM 22, which stores various kinds of data, and a communication interface portion 24, which carries out an interface operation with an external communication network 23, such as an LAN or an internet.

1. First Embodiment

Figure 2:
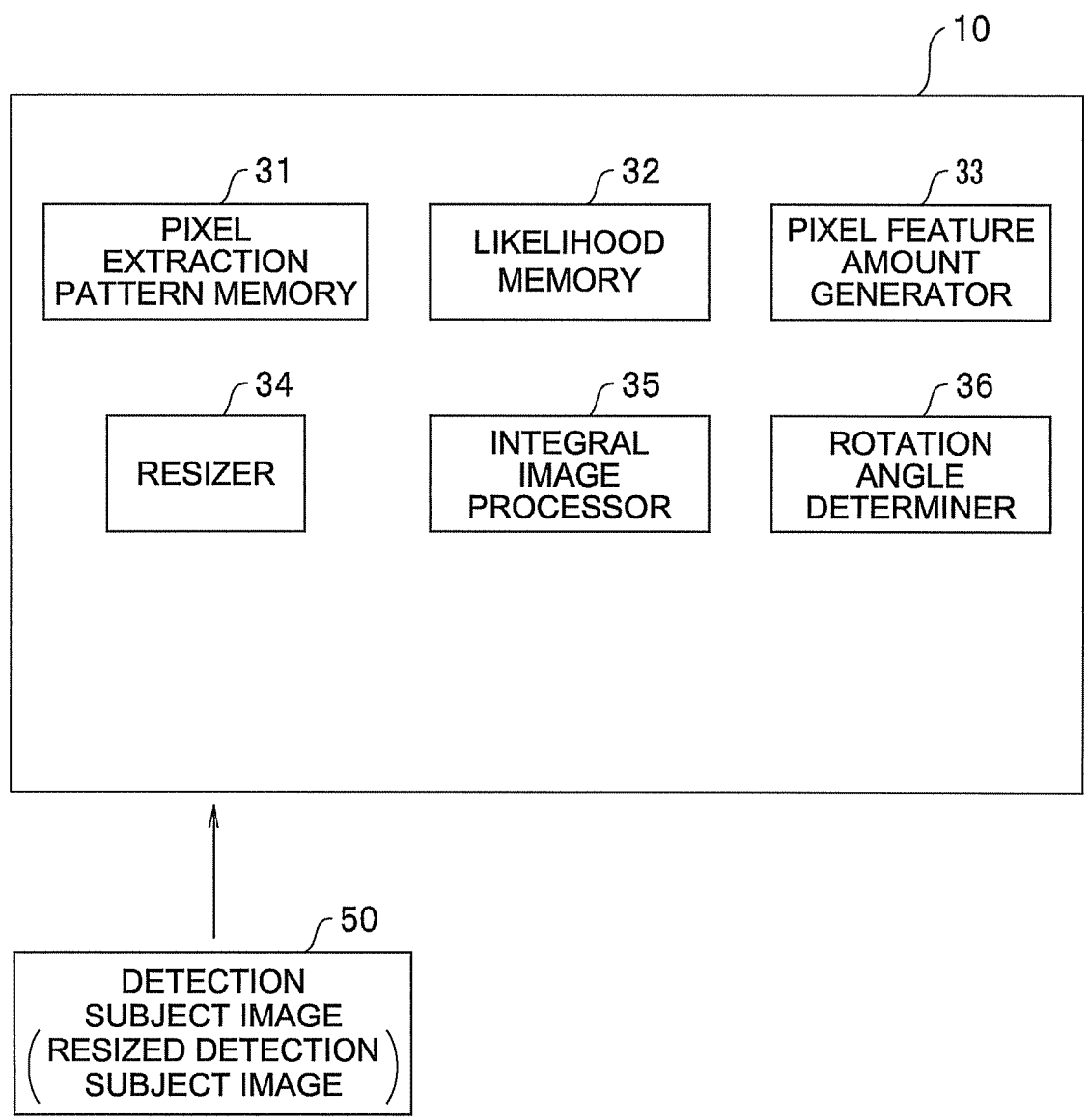
FIG. 2 is a functional block diagram of a rotation angle detection apparatus of a first embodiment.

FIG. 2 is a functional block diagram of the rotation angle detection apparatus of a first embodiment.

The rotation angle detection apparatus 10 includes a pixel extraction pattern memory 31, which stores a pixel extraction pattern for extracting a plurality of rotation angle detection pixels (a pixel area) from the detection subject image, including the object image of a rotation angle detection subject, a likelihood memory 32, which stores a predetermined likelihood of a rotation angle for each angle, correlated to an image feature amount, for each pixel extraction pattern, an image feature amount generator 33, which generates the image feature amount from the detection subject image, a resizer (a resizing processor) 34, which carries out a resizing of the detection subject image, and generates a new detection subject image, an integral image processor 35, which generates an integral image of the image feature amount in order that the image feature amount generator carries out the generation of the image feature amount at a high speed, and a rotation angle determiner 36 which, based on the image feature amount and the likelihood, determines a rotation angle of an object.

FIGS. 3A to 3D are illustrations of examples of the pixel extraction pattern.

Figures 3A, 3B, 3C, 3D:
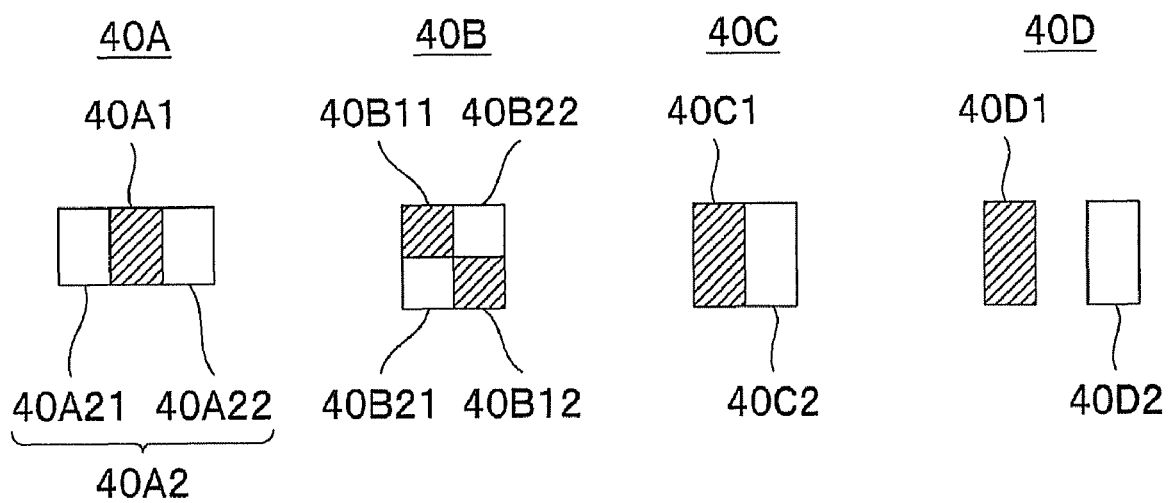
FIGS. 3A to 3D are illustrations of examples of a pixel extraction pattern.

FIG. 3A shows a pixel extraction pattern 40A of a first example which extracts, from the detection subject image, an oblong (rectangular) pixel area configured of a plurality of pixels which detect a luminance difference, as the image feature amount, and has two pixel extraction areas divided as a first pixel extraction area 40A1, defined in such a way that a luminance value representing a corresponding pixel area (a representative luminance value) has a positive value, and a second pixel extraction area 40A2, defined in such a way that a luminance value of a corresponding pixel area (a representative luminance value) has a negative value.

Herein, the second pixel extraction area is further divided into pixel extraction areas 40A21 and 40A22.

Then, a luminance difference in a case of using the kind of pixel extraction pattern shown in FIG. 3A is expressed as follows.

In a case of taking a value of a luminance which represents pixels of a detection subject image corresponding to the first pixel extraction area 40A1 as a luminance value V1, a value of a luminance which represents pixels of a detection subject image corresponding to one pixel extraction area, from among the two pixel extraction areas 40A21 and 40A22 into which the second pixel extraction area 40A2 is divided, as a luminance value V21, and a value of a luminance which represents pixels of a detection subject image corresponding to the other pixel extraction area as a luminance value V22, an image feature amount, that is, a luminance difference V, of a whole corresponding pixel area is $$V=V1+V21+V22.$$

FIG. 3B shows a pixel extraction pattern 40B of a second example which extracts, from the detection subject image, a square pixel area configured of a plurality of pixels which detect a luminance difference, as the image feature amount, segregates the square pixel area into four diametrically opposed squares, and has two pixel extraction areas divided as a first pixel extraction area 40B1, defined in such a way that, being configured of one pair of diametrically opposed square pixel areas, a luminance value representing the pixel area (a representative luminance value) has a positive value, and a second pixel extraction area 40B2, defined in such a way that a luminance value of the other pair of diametrically opposed square pixel areas (a representative luminance value) has a negative value.

Herein, the first pixel extraction area 40B1 is further divided into two square pixel extraction areas 40B11 and 40B12, and the second pixel extraction area 40B2 is further divided into two square pixel extraction areas 40B21 and 40B22.

Then, a luminance difference in a case of using the kind of pixel extraction pattern shown in FIG. 3B is expressed as follows.

In a case of taking a value of a luminance which represents pixels of a detection subject image corresponding to the pixel extraction area 40B11, which configures the first pixel extraction area 40B1, as a luminance value V11, a value of a luminance which represents pixels of a detection subject image corresponding to the pixel extraction area 40B12 as a luminance value V12, a value of a luminance which represents pixels of a detection subject image corresponding to the pixel extraction area 40B21, which configures the second pixel extraction area 40B2, as a luminance value V21, and a value of a luminance which represents pixels of a detection subject image corresponding to the pixel extraction area 40B22 as a luminance value V22, an image feature amount, that is, a luminance difference V, of a whole corresponding pixel area is $$V=V11+V12+V21+V22.$$

FIG. 3C shows a pixel extraction pattern 40C of a third example which extracts, from the detection subject image, a square pixel area configured of a plurality of pixels which detect a luminance difference, as the image feature amount, segregates the square pixel area into two neighboring oblong (rectangular) pixel areas, and has two pixel extraction areas divided as a first pixel extraction area 40C1, defined in such a way that a luminance value representing the oblong pixel area (a representative luminance value) has a positive value, and a second pixel extraction area 40C2, defined in such a way that a luminance value of the oblong pixel area (a representative luminance value) has a negative value.

Then, a luminance difference in a case of using the kind of pixel extraction pattern shown in FIG. 3C is expressed as follows.

In a case of taking a value of a luminance which represents pixels of a detection subject image corresponding to the first pixel extraction area 40C1 as a luminance value V1, and a value of a luminance which represents pixels of a detection subject image corresponding to the second pixel extraction area 40C2 as a luminance value V2, an image feature amount, that is, a luminance difference V, of a whole corresponding pixel area is $V=V1+V2$.

FIG. 3D shows a pixel extraction pattern 40D of a fourth example which extracts, from the detection subject image, two pixel areas, both oblong, configured of a plurality of pixels which detect a luminance difference, and has two pixel extraction areas divided as a first pixel extraction area 40D1, defined in such a way that a luminance value representing the oblong pixel area (a representative luminance value) has a positive value, and a second pixel extraction area 40D2, defined in such a way that a luminance value of the oblong pixel area (a representative luminance value) has a negative value.

Then, a luminance difference in a case of using the kind of pixel extraction pattern shown in FIG. 3D is expressed as follows.

In a case of taking a value of a luminance which represents pixels of a detection subject image corresponding to the first pixel extraction area 40D1 as a luminance value V1, and a value of a luminance which represents pixels of a detection subject image corresponding to the second pixel extraction area 40D2 as a luminance value V2, an image feature amount of a whole corresponding pixel area, that is, a luminance difference V, is $V=V1+V2$.

In the above description, the luminance value has been taken as a detection value itself, but it is also acceptable to arrange in such a way as to use a correction value. For example, a corrected luminance value is expressed by means of the following equation.

Corrected luminance value=(luminance value of object image−average luminance value of object image)/(standard deviation of luminance of object image)/correction value.

Herein, the correction value being a constant number, for example, 2.0 is used.

In a case of actually using the luminance difference, a maximum luminance difference and a minimum luminance difference are estimated from a sample image, and a quantization of the luminance difference (in, for example, 32 steps or 64 steps) is carried out.

Herein, a description will be given of an operation of the integral image processor 35.

Figure 4:
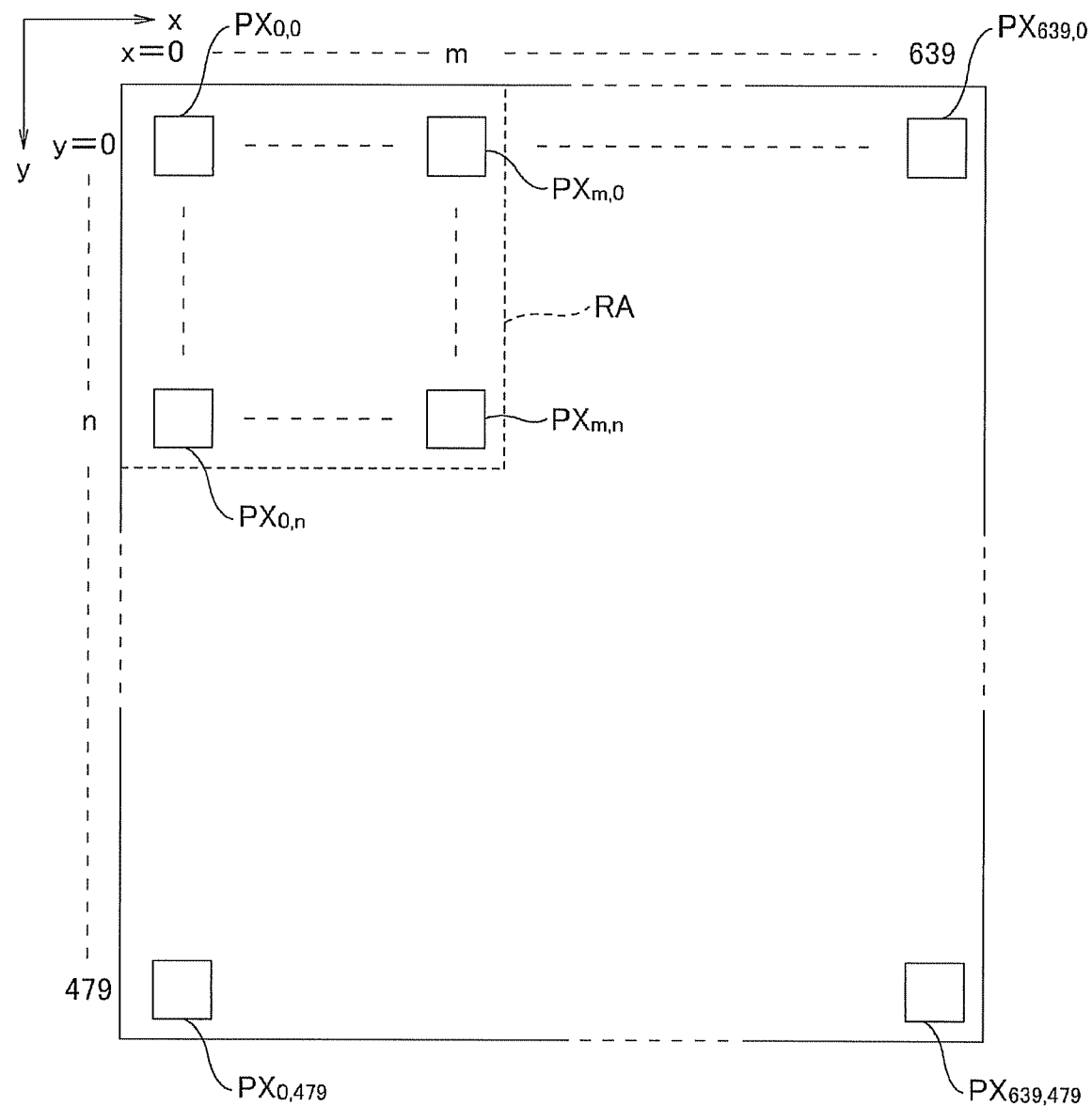
FIG. 4 is an outline illustration of a generation of a luminance value integral image corresponding to a detection subject image.

FIG. 4 is an outline illustration of a generation of a luminance value integral image corresponding to the detection subject image.

FIG. 4 shows a case in which the detection subject image is of 640×480 pixels.

The integral image processor 35 integrates a luminance value, which is an image feature amount of all pixels PX0,0 to PXm,n within a rectangle RA, having as diametrically opposed apices a reference position pixel PX0,0 and a subject pixel PXm,n, which configures the detection subject image, and makes it a luminance integration value corresponding to the subject pixel PXm,n.

Figure 5:
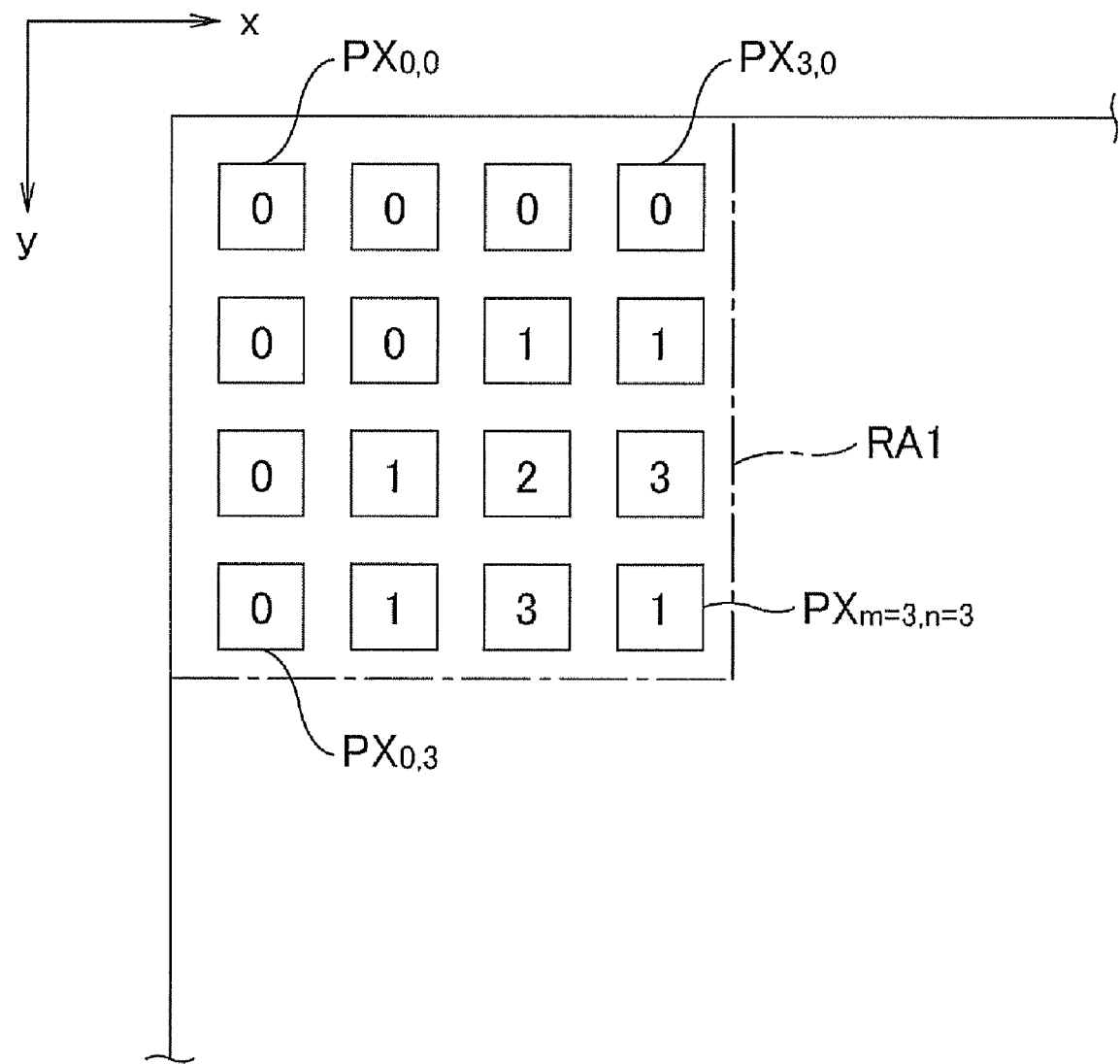
FIG. 5 is an illustration for a concrete description of the integral image generation.

FIG. 5 is an illustration for a concrete description of the integral image generation.

Specifically, as shown in FIG. 5, in a case in which the subject pixel PXm,n=PX3,3, values of all pixels PX0,0 to PX3,3 within a rectangle RA1, having as diametrically opposed apices the reference position pixel PX0,0 and the subject pixel PX3,3, are integrated (actually, simply added), and a luminance integration value ΣPX3,3, corresponding to the subject pixel PX3,3, is calculated.

Figure 6:
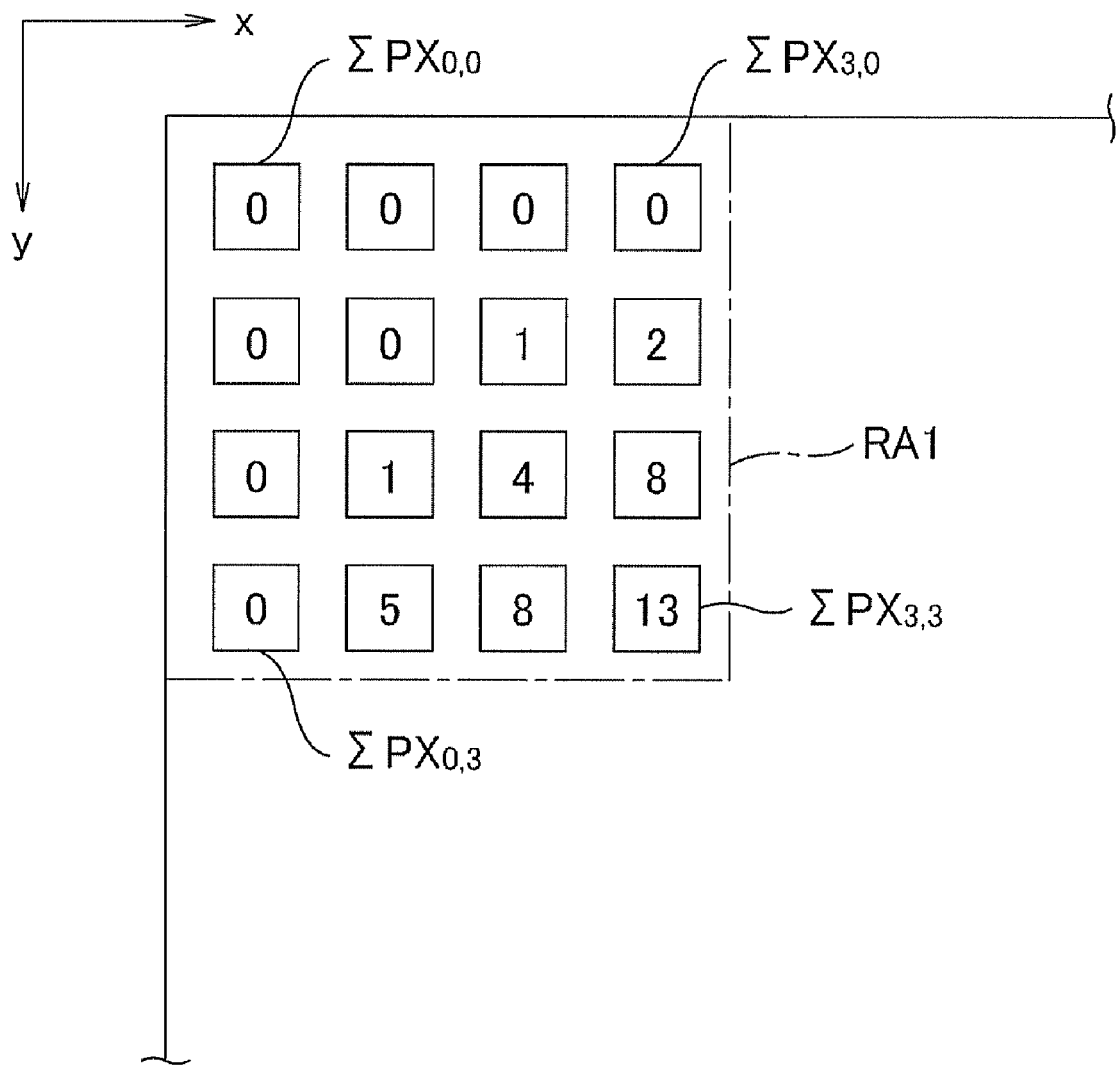
FIG. 6 is an illustration of the generated integral image.

FIG. 6 is an illustration of a generated integral image.

Although, in FIG. 6, in order to facilitate understanding, a description is given of a case in which the luminance seeks a value of 0 to 3, actually, a more multi-step (for example, 256 steps) luminance value is used.

Specifically, in the case of FIG. 6, the luminance integration value is calculated by means of the following equation.

$\Sigma PX3,3 = 0+0+0+0+0+0+1+1+0+1+2+3+0+1+3+1 = 13$

In the same way, an integral image corresponding to the luminance integration value within the rectangle RA1, having as the diametrically opposed apices the reference position pixel PX0,0 and the subject pixel PX3,3, is of the kind shown in FIG. 6.

Figure 7:
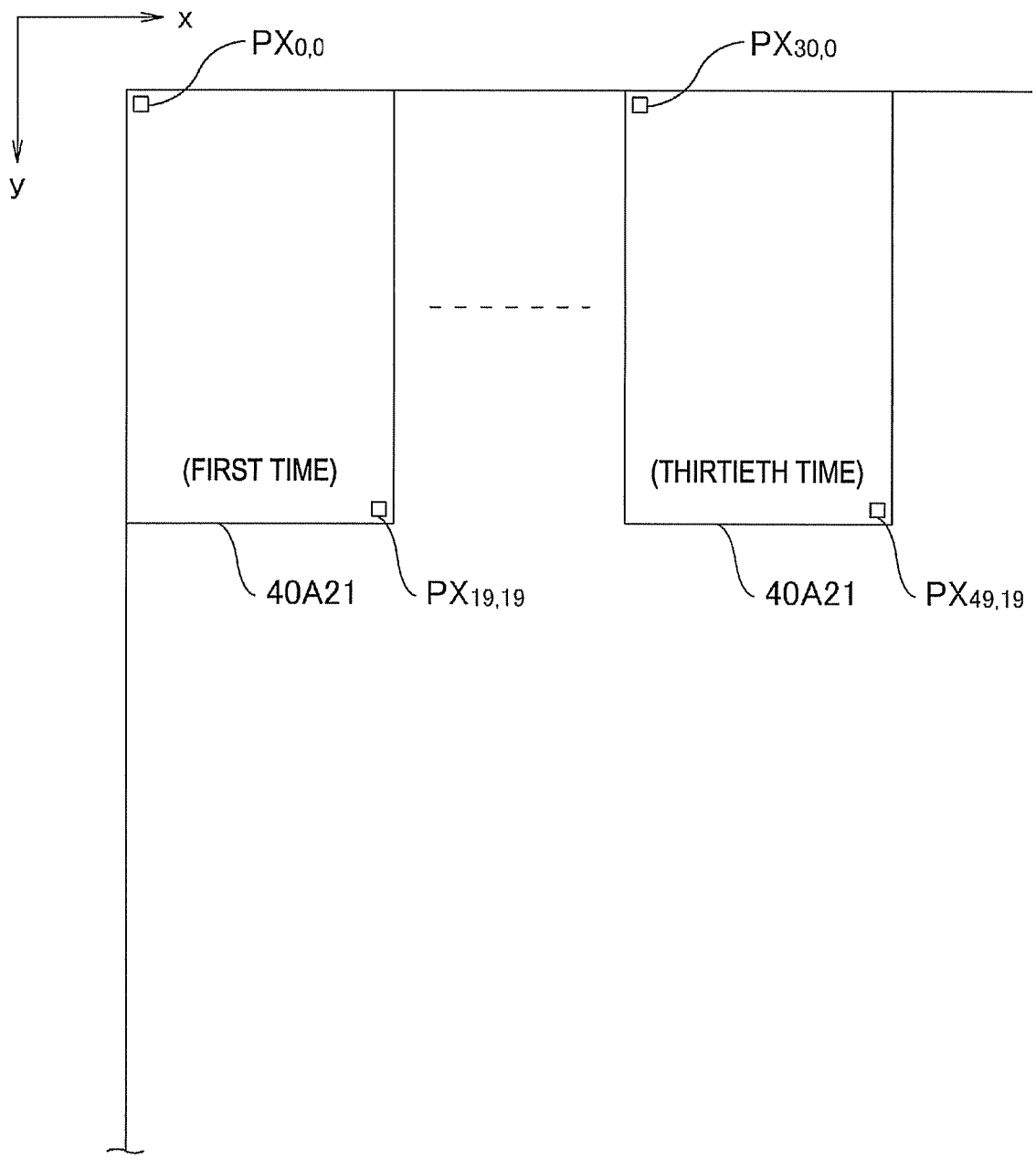
FIG. 7 is an illustration of a setting condition of pixel extraction areas which configure a pixel extraction pattern.

FIG. 7 is an illustration of a setting condition of pixel extraction areas which configure a pixel extraction pattern.

For example, in a case in which sizes of the pixel extraction areas 40A1, 40A21 and 40A22 shown in FIG. 3A are each taken as 20×20 pixels, in an initial condition (a first time), the pixel extraction area 40A21 corresponds to an area of a rectangle having as diametrically opposed apices a start pixel PX0,0 and a finish pixel PX19,19.

Then, in a case in which a pixel quantity of the detection subject image is taken as 640×480, and the finish pixel is taken as PXP,Q (0≦P≦639, 0≦Q≦479), the pixel extraction areas 40A1, 40A21 and 40A22 are set keeping a value of Q the same until P=580 (=639−59). Subsequently, at a point at which P=620, 1 is added to the value of Q, a value of P is made 0 again, and next pixel extraction areas 40A1, 40A21 and 40A22 are set.

In the same way, the setting of the pixel extraction areas 40A1, 40A21 and 40A22 is repeated until P=580 (=639−59), and Q=460 (=479−19).

Herein, a description will be given of a principle of the calculation of the luminance integration value.

In a case in which a luminance (an image feature amount) in a pixel PXx,y is taken as C, an integral image II (PXx,y) is calculated by means of the following equation.

$$\text{Integral image } II(PX\ x, y) \sum_{x' \leq x, y' \leq y} C(PX\ x, y)$$

By using the integral image generated by the integral image processor, it is possible to calculate swiftly a luminance integration value (a sum of a luminance of each pixel) for each of the pixel extraction areas 40A1, 40A21 and 40A22.

By making a range of any one pixel extraction area (x0≦x≦x1, y0≦y≦y1), the luminance integration value is expressed by means of the following equation.

$II(PXx_1,x_1)+II(PXx_0-1,y_0-1)-II(PXx_0,y_0-1)-II(PXx_0-1,y_0)$

In this case, as it is sufficient to carry out the process which generates the integral image at most once for the original detection subject image or the detection subject image after the resizing, a high-speed calculation is possible regardless of a pixel quantity within the area.

Next, a description will be given of a more concrete calculation of an integrated luminance value.

Figure 8:
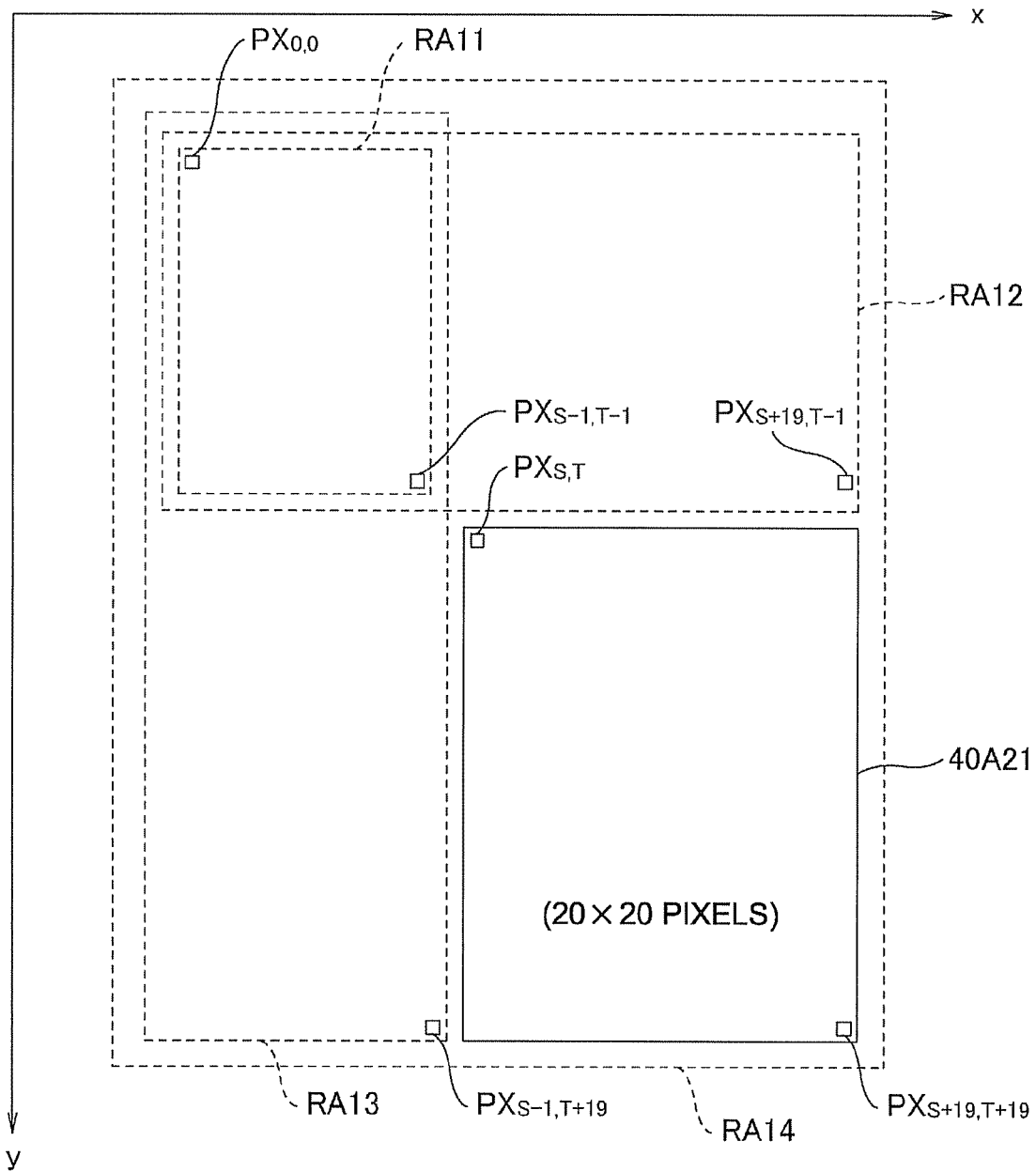
FIG. 8 is an illustration of a calculation of an integrated luminance value.

FIG. 8 is an illustration of the calculation of the integrated luminance value.

In the calculation of the integrated luminance value, the detection apparatus main body 11, in a case of calculating an integrated luminance value of pixels corresponding to the pixel extraction area 40A21, carries out the calculation using integration values of each rectangle RA11 to RA14.

Specifically, by making the size of the pixel extraction area 40A21 20×20 pixels, as heretofore described, in a case in which the start pixel of the pixel extraction area 40A21 is PXS,T, the finish pixel is PXS+19,T+19.

At this time, the rectangle RA11 is a rectangle having as diametrically opposed apices the start pixel PX0,0 and a finish pixel PXS−1,T−1. Consequently, an integration value ΣRA11 of the rectangle RA11 is ΣPXS−1,T−1.

In the same way, the rectangle RA12 is a rectangle having as diametrically opposed apices the start pixel PX0,0 and a finish pixel PXS+19,T−1. Consequently, an integration value ΣRA12 of the rectangle RA12 is ΣPXS+19,T−1.

Also, the rectangle RA13 is a rectangle having as diametrically opposed apices the start pixel PX0,0 and a finish pixel PXS−1,T+19. Consequently, an integration value ΣRA13 of the rectangle RA13 is ΣPXS−1,T+19.

Also, the rectangle RA14 is a rectangle having as diametrically opposed apices the start pixel PX0,0 and a finish pixel PXS+19,T+19. Consequently, an integration value ΣRA14 of the rectangle RA14 is ΣPS+19,T+19.

As a result of these, an integrated luminance value ΣDW of the pixels corresponding to the pixel extraction area 40A21 is expressed by means of the following equation.

$$\Sigma DW = \Sigma RA14 + \Sigma RA11 - \Sigma RA12 - \Sigma RA13.$$

Next, a description will be given of an operation of the first embodiment.

Figure 9:
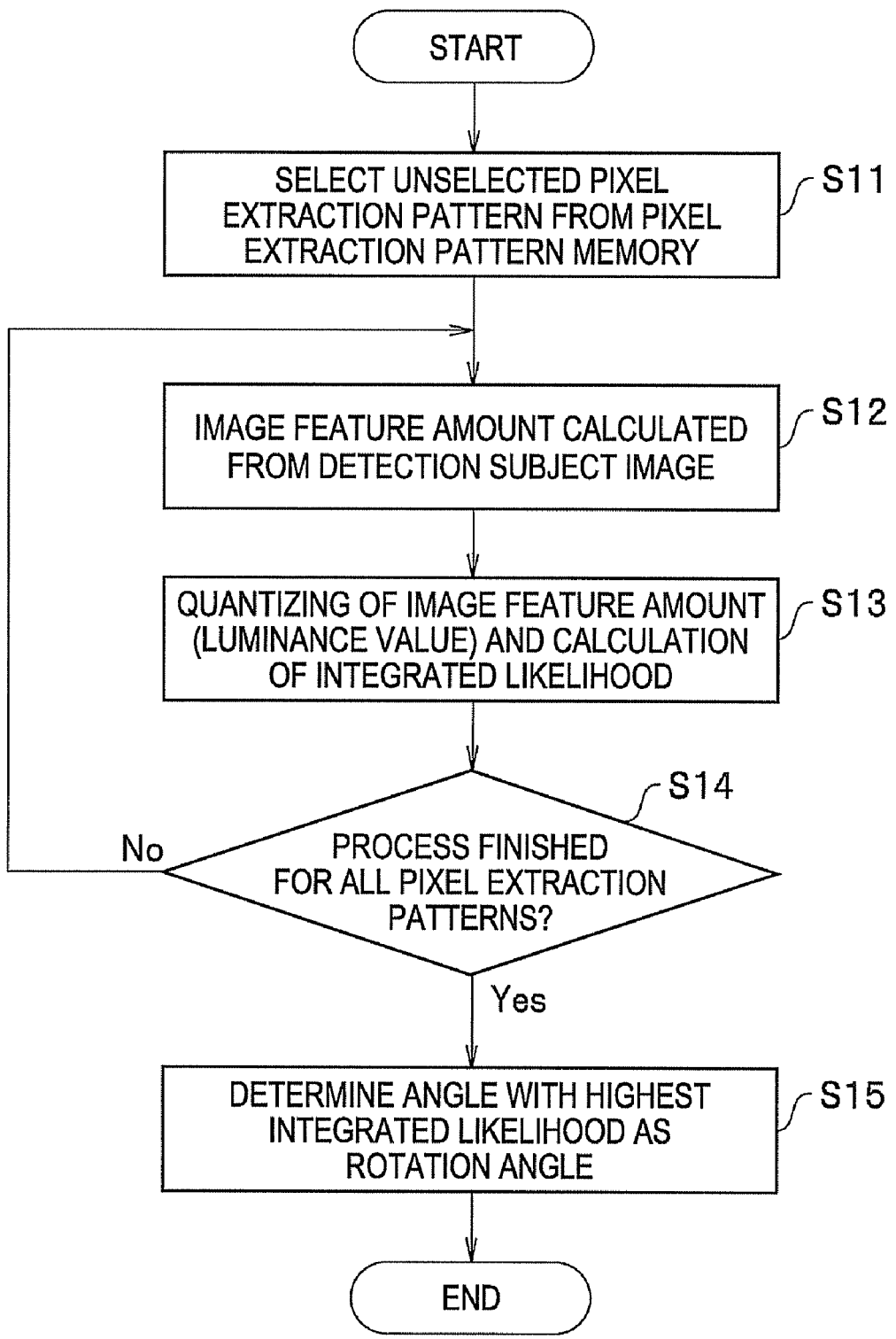
FIG. 9 is a process flowchart of the first embodiment.

FIG. 9 is a process flowchart of the first embodiment.

As shown in FIG. 2, on a detection subject image 50 being input into the rotation angle detection apparatus 10, the MPU 21 of the detection apparatus main body 11 reads a pixel extraction pattern (specifically, any one of the heretofore described pixel extraction patterns 40A to 40D) from the external storage device 16, which functions as the pixel extraction pattern memory 31 (step S11).

Next, the MPU 21 extracts pixels corresponding to each of the pixel extraction areas, using the pixel extraction pattern read from the detection subject image 50 (step S12).

Continuing, the MPU 21 calculates an image feature amount (an integrated luminance value) of the extracted pixels, based on the heretofore described integrated luminance value calculation method (step S12).

Then, the MPU 21 quantizes the calculated image feature amount and, referring to an angle likelihood table stored in the external storage device 16, which functions as the likelihood memory 32, adds a likelihood corresponding to the image feature amount (the integrated luminance value) for each rotation angle in a determination likelihood memory, and calculates a cumulative likelihood (step S13).

Herein, a more concrete description of a calculation of the cumulative likelihood will be given.

FIG. 10 shows an example of an angle likelihood table corresponding to one pixel extraction pattern, while FIG. 11 shows an example of an angle likelihood table corresponding to another pixel extraction pattern. Each value expressing an appearance frequency, FIGS. 9 and 10 express appearance frequencies in a case in which a sample image quantity=1000.

That is, a notation of 190/1000 expresses a fact that, of the sample quantity of 1000, 190 samples apply.

Regarding a compilation of these angle likelihood tables, as a detailed description is given in a second embodiment, the description will be omitted here.

The cumulative likelihood having a value which adds likelihoods corresponding to all pixel extraction patterns for every rotation angle (for example, 5 degree units in a range of 0 to 355 degrees), in the initial condition, all cumulative likelihoods are taken as zero.

In the event that the luminance difference is used as the image feature amount, in a case in which the luminance value is detectable in 256 steps, 0 to 255, the luminance difference has 511 steps, −255 to 255. However, as a processing amount becomes huge when segregating minutely in this way, in the embodiment, as shown in FIGS. 10 and 11, the luminance difference is quantized, and the process is carried out with it having 21 steps, −10 to 10.

Then, a number of likelihoods, for each rotation angle of the object, equivalent to the number of pixel extraction patterns, is stored in advance, correlated to the quantized luminance value, as the angle likelihood table in the external storage device.

Figure 12A:
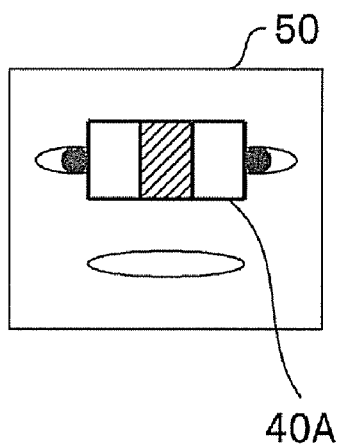
FIGS. 12A to 12C are illustrations of cases of applying an image extraction pattern to a detection subject image (or a resized detection subject image).
Figure 12B:
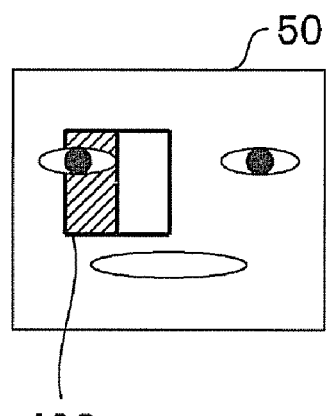
Figure 12C:
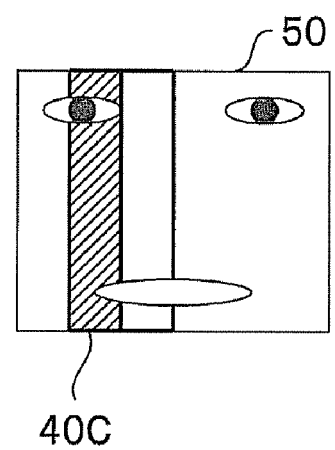

FIGS. 12A to 12C are illustrations of cases of applying an image extraction pattern to a detection subject image (or a resized detection subject image).

FIG. 12A shows a case of applying the image extraction pattern 40A, while FIGS. 12B and 12C show cases of applying the image extraction pattern 40C.

Although the cases shown in FIGS. 12A to 12C are cases in which a facial image, which is the object, has a rotation angle of 0 degrees (a reference disposition position) in the detection subject image (or the resized detection subject image) 50, actually, it is common that the object has a predetermined rotation angle in the detection subject image 50.

In this condition, the detection apparatus main body 11, which functions as the image feature amount generator 33, quantizes the integrated luminance value, which is the image feature amount, for each pixel extraction pattern and, each time it refers to the angle likelihood table, adds a logarithmic value (a logarithmic likelihood) of a read likelihood for each angle, and generates a cumulative likelihood table. In this case, the cumulative likelihood table has 72 memory areas corresponding to 0 to 355 degrees. Also, a reason for adding the logarithmic likelihood is to facilitate the calculation.

More specifically, in a kind of case which an angle likelihood table corresponding to any one pixel extraction pattern indicates in FIG. 10, in the event that the quantized luminance difference is 0, a likelihood table 32A1 of the luminance difference 0 is referred to.

Then, a logarithmic value of a value of the likelihood table for each rotation angle is added to the cumulative likelihood table.

That is, in a case in which the cumulative likelihood table is in the initial condition at the point at which the likelihood table 32A1 of the luminance difference 0 is referred to, values of the cumulative likelihood table are, in sequence from 0 degrees, log(190/1000+c), log(45/1000+c), . . . , log(500/1000+c), . . . , log(10/1000+c), log(2/1000+c). Herein c, being a constant having an extremely small value, is for preventing the logarithmic value from not being fixed, theoretically or in the calculation process.

In the same way, in a kind of case which an angle likelihood table corresponding to another pixel extraction pattern indicates in FIG. 11, in the event that the quantized luminance difference is −5, a likelihood table 32B1 of the luminance difference −5 is referred to.

As a result of this, values of the cumulative likelihood table are, in sequence from 0 degrees, $\log(190/1000+c)+\log(16/1000+c)$, $\log(45/1000+c)+\log(31/1000+c)$, ..., $\log(500/1000+c)+\log(471/1000+c)$, ..., $\log(10/1000+c)+\log(10/1000+c)$, $\log(2/1000+c)+\log(2/1000+c)$.

Then, the MPU 21 determines, for all the pixel extraction patterns, whether or not the calculation of the cumulative likelihood is finished (step S14).

If, according to the determination of step S14, the calculation of the cumulative likelihood is not yet finished for all the pixel extraction patterns (step S14; No), the MPU 21 shifts the process to step S11 again, and carries out the subsequent processes in the same way.

If, according to the determination of step S14, the calculation of the cumulative likelihood is finished for all the pixel extraction patterns (step S14; Yes), the MPU 21 determines that a rotation angle having a cumulative likelihood with a highest value is a rotation angle of the object (step S15).

As heretofore described, according to the embodiment, as the luminance value is used in the detection of the rotation angle, color information on a color and the like of a person's skin, which is affected by properties of lighting (brightness, a color temperature and the like), is not used, meaning that an accurate rotation angle detection can be carried out.

Also, as the detection of the rotation angle is carried out with the luminance difference as the image feature amount, it is possible to detect the rotation angle without being overly affected by a change in the lighting.

Furthermore, as the rotation angle detection is based on a likelihood stored (calculated) in advance, an easy and swift rotation angle detection can be carried out.

2. Second Embodiment

In the heretofore described first embodiment, the angle likelihood table is stored in advance, but the second embodiment is an embodiment of a case of carrying out the process from a generation of the angle likelihood table.

Figure 13:
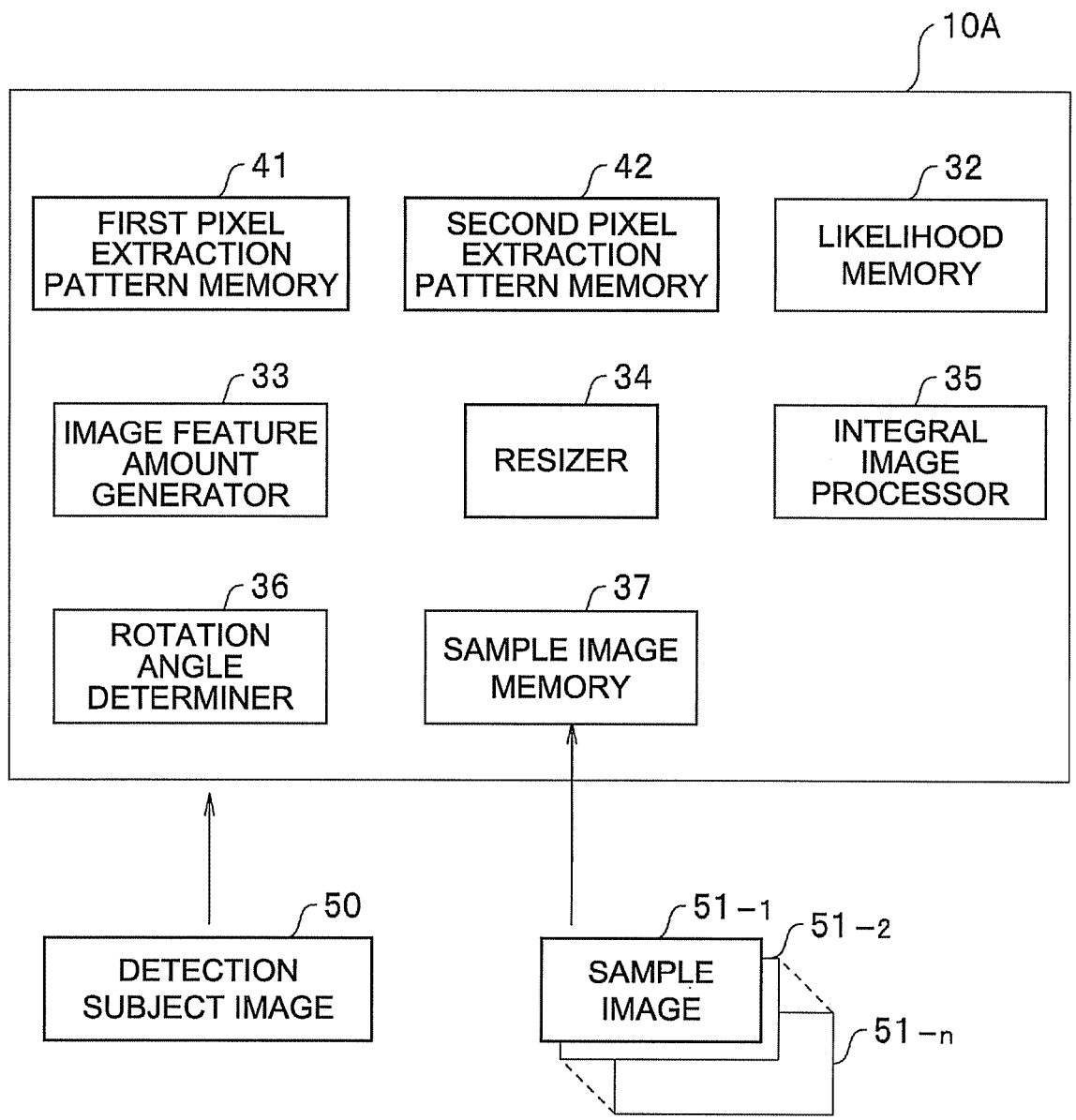
FIG. 13 is a functional block diagram of a rotation angle detection apparatus of a second embodiment.

FIG. 13 is a functional block diagram of a rotation angle detection apparatus of the second embodiment.

In FIG. 13, portions identical to those of the first embodiment of FIG. 2 are given identical reference numerals.

A rotation angle detection apparatus 10A of the second embodiment includes a first pixel extraction pattern memory 41, which stores in advance a plurality of pixel extraction patterns which extract a plurality of rotation angle detection pixels (a pixel area) from sample images 51-1 to 51-n, a second pixel extraction pattern memory 42, which stores a pixel extraction pattern for extracting a plurality of rotation angle detection pixels (a pixel area) from the detection subject image, including the object image of the rotation angle detection subject, the likelihood memory 32, which stores the predetermined likelihood of the rotation angle for each angle, correlated to the image feature amount, for each pixel extraction pattern stored in the second pixel extraction pattern memory 42, the image feature amount generator 33, which generates the image feature amount from the detection subject image, the resizer (the resizing processor) 34, which carries out the resizing of the detection subject image, and generates a new detection subject image, the integral image processor 35, which generates the integral image of the image feature amount in order that the image feature amount generator carries out the generation of the image feature amount at a high speed, and the rotation angle determiner 36 which, based on the image feature amount and the likelihood, determines the rotation angle of the object.

Figure 14:
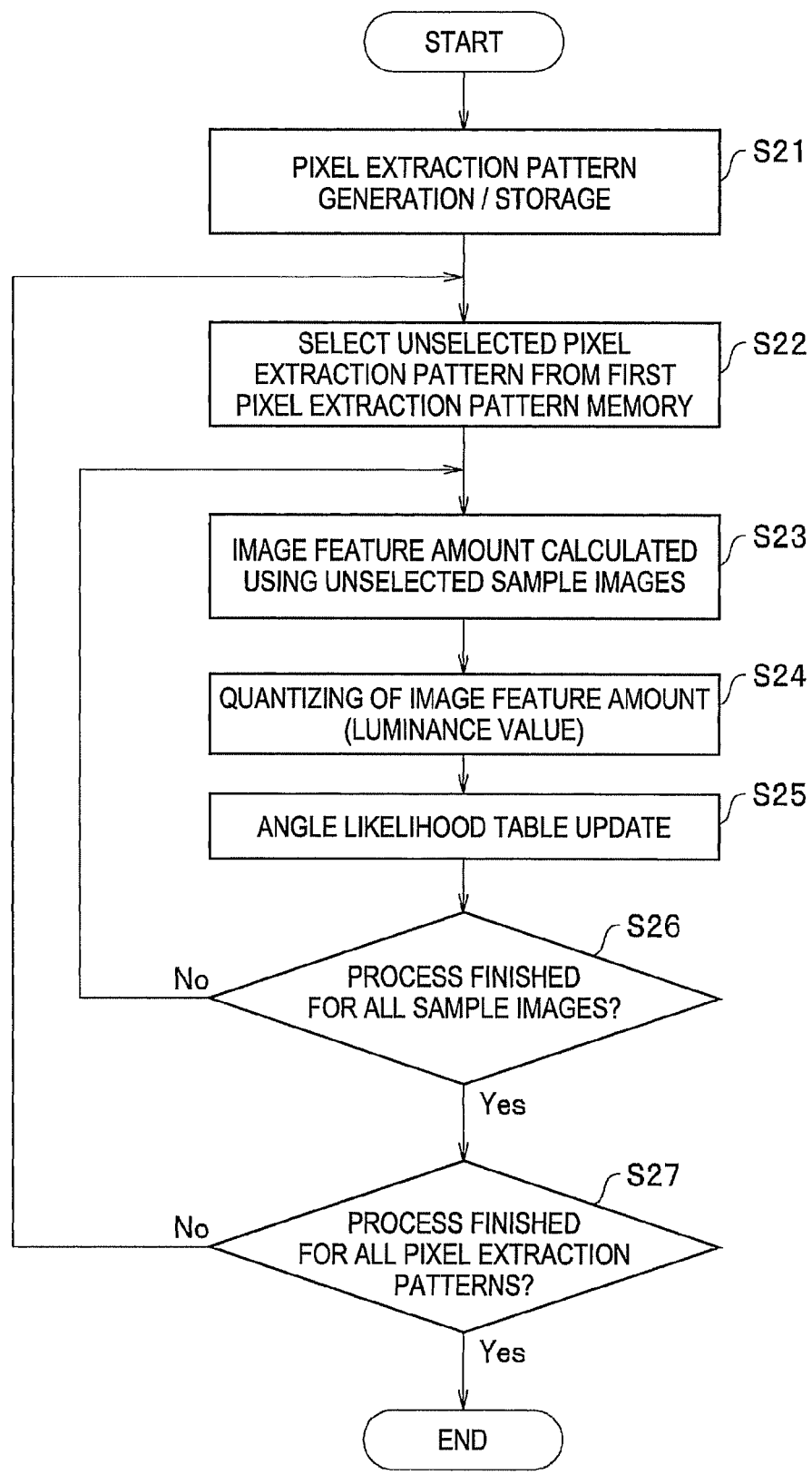
FIG. 14 is a process flowchart of an image extraction pattern selection process of the second embodiment.

FIG. 14 is a process flowchart of an image extraction pattern selection process of the second embodiment.

In this case, it is taken that the sample images 51-1 to 51-n are stored in advance in a sample image memory 37.

Firstly, the rotation angle detection apparatus 10A, in accordance with an instruction from an operator or a setting, generates a large number of pixel extraction patterns (original pixel extraction patterns), and stores them in the first pixel extraction pattern memory 41 (step S21).

Next, the rotation angle detection apparatus 10A selects a pixel extraction pattern which is still in an unselected condition from the first pixel extraction pattern memory 41 (step S22).

The rotation angle detection apparatus 10A chooses any one sample image 51-x (x: 1 to n) stored in the sample image memory 37, and calculates the image feature amount (in the embodiment, the luminance difference) corresponding to the pixel extraction pattern selected in step S22 for each predetermined rotation angle (in the embodiment, 5 degree units in the range of 0 to 355 degrees) (step S23).

Continuing, the detection apparatus main body 11 quantizes the calculated image feature amount (step S24).

Then, the detection apparatus main body 11 updates the angle likelihood table of the likelihood memory 32, based on a quantized value of the luminance difference, which is the quantized image feature amount, and a corresponding rotation angle (step S25).

Next, the detection apparatus main body 11 determines, for the selected pixel extraction pattern, whether or not the process is finished for all the sample images (step S26).

If, according to the process of step S26, the process updating the angle likelihood table is not yet finished for all the sample images (step S26; No), the detection apparatus main body 11 shifts the process to step S23 again, and repeats the same kinds of process.

If, according to the process of step S26, the process updating the angle likelihood table is finished for all the sample images, the detection apparatus main body 11 determines whether or not the process is finished for all the pixel extraction patterns (step S27).

If, according to the determination of step S27, the process updating the angle likelihood table is not yet finished for all the pixel extraction patterns (step S27; No), the detection apparatus main body 11 shifts the process to step S22 again, and subsequently repeats the same kinds of process.

If, according to the determination of step S27, the process updating the angle likelihood table is finished for all the pixel extraction patterns (step S27; Yes), the detection apparatus main body 11 finishes the process.

Figure 15:
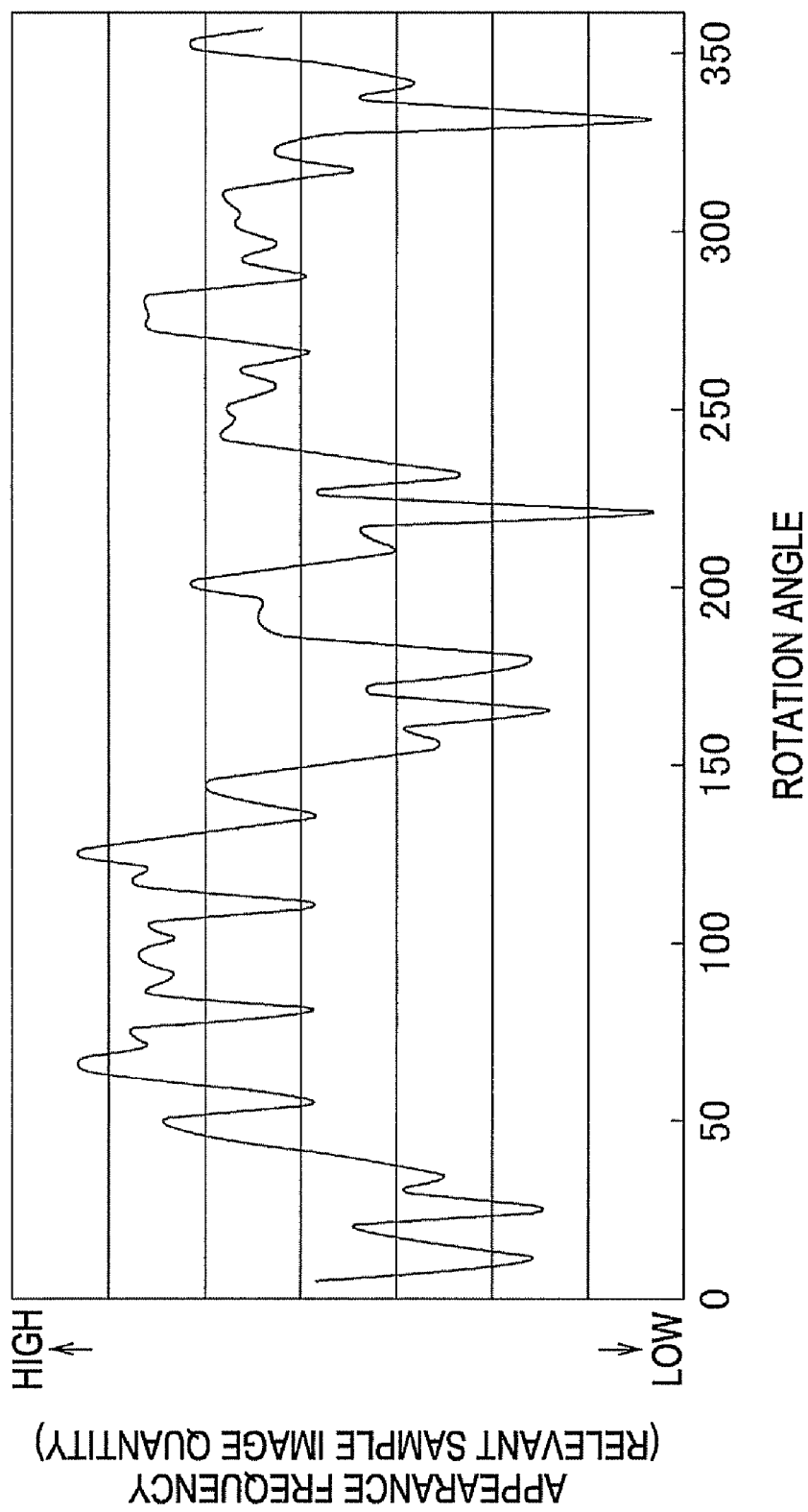
FIG. 15 is a diagram describing a relationship between an appearance frequency of a sample image corresponding to a certain image feature amount (a luminance difference) and a rotation angle of the sample image.

FIG. 15 is a diagram describing a relationship between an appearance frequency of a sample image corresponding to a certain image feature amount (luminance difference) and a rotation angle of the sample image.

In FIG. 15, the appearance frequency being high means that, in a case of using the selected pixel extraction pattern, there exist a large number of sample images with the image feature amount (the luminance difference).

Figure 16:
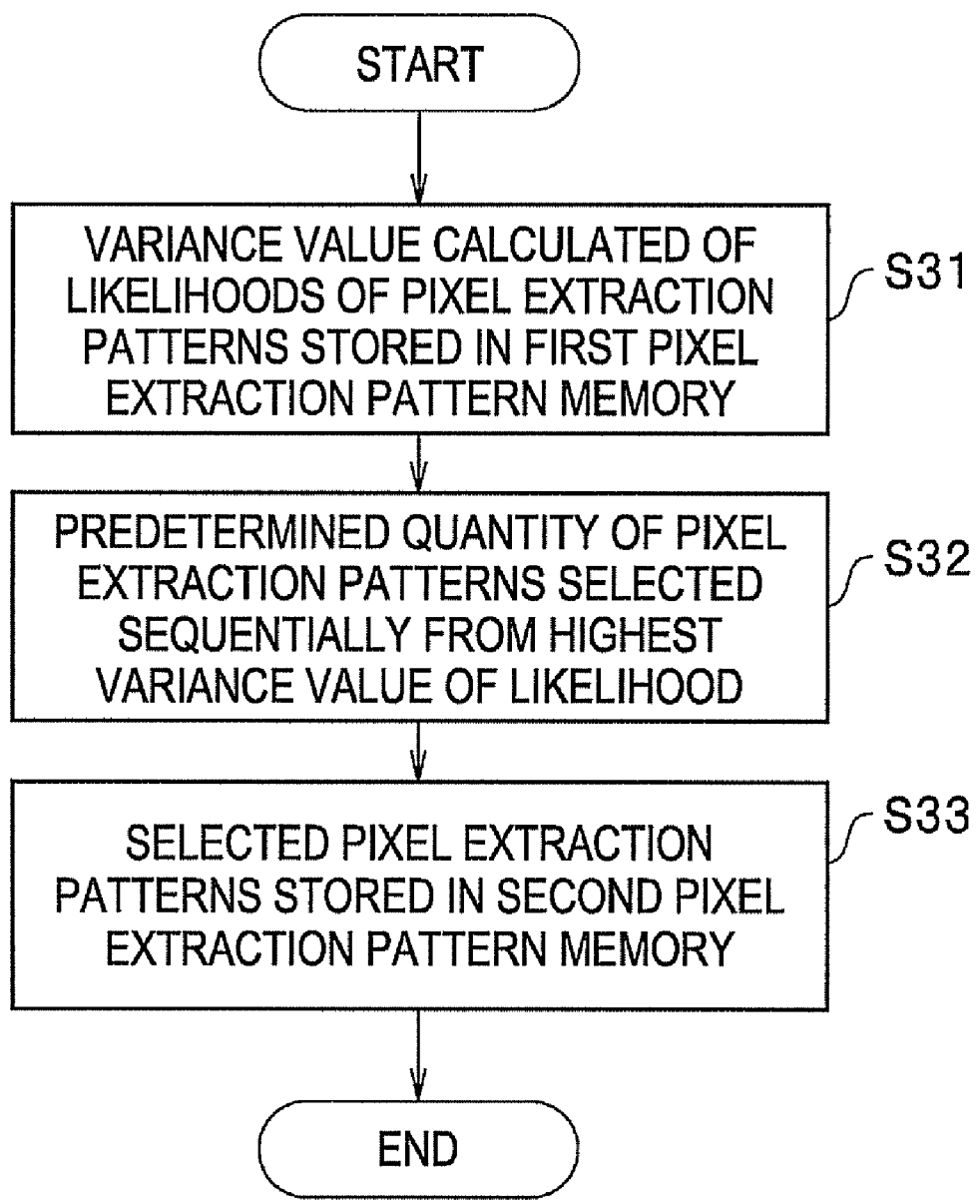
FIG. 16 is a process flowchart of a selection process which selects a pixel extraction pattern to be used in an actual process.

FIG. 16 is a process flowchart of a selection process which selects a pixel extraction pattern to be used in the actual process.

Firstly, the detection apparatus main body 11 calculates a variance value (a fluctuation of the likelihood) of each likelihood corresponding to the pixel extraction patterns (the original pixel extraction patterns) of the first pixel extraction pattern memory 41 (step S31).

More specifically, the detection apparatus main body 11, referring to the angle likelihood table corresponding to each pixel extraction pattern, calculates the fluctuation of the likelihood (a fluctuation of the appearance frequency) when the rotation angle changes. Herein, the fluctuation of the likelihood corresponds to an amplitude of a graph waveform in FIG. 15.

Continuing, the detection apparatus main body 11, regarding the fluctuation of the likelihoods of each of the pixel extraction patterns (the original pixel extraction patterns) stored in the first pixel extraction pattern memory 41, selects a number of pixel extraction patterns equivalent to the pixel extraction patterns used in the actual rotation angle detection, sequentially from one with a greatest fluctuation of the likelihood (step S32). That is, the detection apparatus main body 11, for each rotation angle, selects the pixel extraction pattern with the greatest fluctuation of the likelihood as the pixel extraction pattern in the relevant rotation angle.

Next, the detection apparatus main body 11 stores the selected pixel extraction patterns in the second pixel extraction pattern memory 42 (step S33). By this means, as the second pixel extraction pattern memory 42 functions in the same way as the pixel extraction pattern memory 31 in the first embodiment, the rotation angle is detected by the same method as in the first embodiment.

According to the second embodiment, as the pixel extraction patterns with the greatest fluctuations of the likelihood are selected, using the sample images, from the generated large number of pixel extraction patterns (the original pixel extraction patterns), as the rotation angle detection pixel extraction patterns, it being possible to easily select effective pixel extraction patterns, it is possible to reliably determine the rotation angle of the object included in the detection subject image.

3. Third Embodiment

Although, in the heretofore described second embodiment, the pixel extraction patterns are selected based on the fluctuations of the likelihood in the determinations of steps S31 to S33, it is also possible to configure in such a way that the pixel extraction patterns are selected in an order indicating a largest likelihood.

According to the third embodiment, it is possible to obtain an advantage equivalent to that of the second embodiment, with a simpler configuration.

4. Fourth Embodiment

Although, in the heretofore described second embodiment, the pixel extraction patterns are selected based on the fluctuations of the likelihood in the determinations of steps S31 to S33, it is also possible to configure in such a way that the pixel extraction patterns are selected, for predetermined angles which are the detection subjects (for each angle 0 degrees, 5 degrees, and so on), in the order indicating the largest likelihood.

According to the fourth embodiment, as the original extraction patterns with the greatest likelihoods are selected as the pixel extraction patterns for each rotation angle, it being possible to select a pixel extraction pattern effective for the rotation angle of the object, it is possible to more reliably detect the rotation angle.

5. Fifth Embodiment

Although, in the heretofore described second embodiment, the pixel extraction patterns are selected based on the fluctuations of the likelihood in the determinations of steps S31 to S33, it is also possible to configure in such a way that the pixel extraction patterns are selected, for the predetermined angles which are the detection subjects (for each angle 0 degrees, 5 degrees, and so on), in an order indicating the largest likelihood and indicating, for angles other than the predetermined angles, a largest difference in likelihood.

That is, in a case in which a size of a likelihood (a maximum likelihood) of a specified rotation angle is outstandingly larger than other rotation angles, it being possible to select the relevant original pixel extraction pattern as the pixel extraction pattern, it is possible to more reliably detect the rotation angle.

6. Example of Modification of the Embodiments

Although, in the description given heretofore, a configuration has been employed which, when generating the integrated luminance value, which is the image feature amount, makes the size of the pixel extraction pattern constant, and resizes the detection subject image, it is also possible to employ a configuration which resizes (enlarges or reduces) the pixel extraction pattern, within a range not exceeding the size of the detection subject image, without carrying out the resizing of the detection subject image.

The entire disclosure of Japanese Patent Application No. 2006-277185, filed Oct. 11, 2006 is expressly incorporated by reference herein.

What is claimed is:

1. A rotation angle detection apparatus which detects a rotation angle with respect to a reference disposition position of an object included in a detection subject image, comprising:
    a plurality of kinds of pixel extraction pattern for extracting a plurality of pixels which detect an image feature amount from pixels configuring the detection subject image;
    a feature amount detector which detects, for each pixel extraction pattern, an image feature amount of the extracted plurality of pixels;
    a likelihood memory which stores a likelihood of the rotation angle, correlated in advance to the image feature amount, for each pixel extraction pattern;
    a rotation angle determiner which determines a rotation angle which has a greatest likelihood, based on the image feature amount corresponding to each pixel extraction pattern and on the likelihood, as the rotation angle of the object; and
    an integral image generator which, integrating luminance values of all pixels within a rectangle having as diametrically opposed apices a predetermined reference position pixel and a subject pixel, and making them an integrated pixel value corresponding to the subject pixel, calculates an integrated pixel value corresponding to all the pixels configuring the detection subject image, and generates an integral image;
    wherein the feature amount detector detects the image feature amount based on the integral image.

2. The rotation angle detection apparatus according to claim 1, wherein
    the likelihood memory quantizes the image feature amount in a plurality of steps, and
    stores the likelihood for each step and for each predetermined rotation angle.

3. The rotation angle detection apparatus according to claim 1, wherein
    the rotation angle determiner, adding likelihoods corresponding to all the pixel extraction patterns for each predetermined rotation angle, generates a cumulative likelihood, and determines the predetermined rotation angle for which the cumulative likelihood is highest as the rotation angle of the object.

4. The rotation angle detection apparatus according to claim 1, wherein
the image feature amount is a luminance difference of luminances which, when a pixel area configured of the plurality of pixels which detect the image feature amount is divided into two pixel areas, represent each pixel area.

5. The rotation angle detection apparatus according to claim 1, further comprising:
a resizing processor which, by carrying out a resizing of an immediately preceding detection subject image or a resizing of an immediately preceding pixel extraction pattern, and generating a current detection subject image or a current pixel extraction pattern, carries out a change of relative sizes of the detection subject image and the pixel extraction pattern.

6. The rotation angle detection apparatus according to claim 1, further comprising:
an extraction pattern generator which generates a plurality of kinds of original pixel extraction pattern;
a likelihood calculator which, based on a plurality of sample images for which the original pixel extraction patterns and rotation angles are already known, calculates a likelihood for each rotation angle; and
an extraction pattern selector which, based on a fluctuation of the calculated likelihoods, selects original pixel extraction patterns with higher fluctuations of the likelihood as the pixel extraction patterns.

7. The rotation angle detection apparatus according to claim 1, further comprising:
an extraction pattern generator which generates a plurality of kinds of original pixel extraction pattern;
a likelihood calculator which, based on a plurality of sample images for which the original pixel extraction patterns and rotation angles are already known, calculates a likelihood for each rotation angle; and
an extraction pattern selector which, based on sizes of the calculated likelihoods, selects original pixel extraction patterns with greater likelihoods as the pixel extraction patterns.

8. The rotation angle detection apparatus according to claim 1, further comprising:
an extraction pattern generator which generates a plurality of kinds of original pixel extraction pattern;
a likelihood calculator which, based on a plurality of sample images for which the original pixel extraction patterns and rotation angles are already known, calculates a likelihood for each rotation angle; and
an extraction pattern selector which, based on sizes of likelihoods calculated for identical rotation angles, selects original pixel extraction patterns with greater likelihoods as the pixel extraction patterns corresponding to the relevant rotation angles.

9. The rotation angle detection apparatus according to claim 1, further comprising:
an extraction pattern generator which generates a plurality of kinds of original pixel extraction pattern;
a likelihood calculator which, based on a plurality of sample images for which the original pixel extraction patterns and rotation angles are already known, calculates a likelihood for each rotation angle; and
an extraction pattern selector which, for identical rotation angles, selects original pixel extraction patterns, from among a plurality of original pixel extraction patterns having the greatest likelihood, with a greater size of difference in sizes of the greatest likelihood and a likelihood corresponding to other rotation angles other than the identical rotation angles, as the pixel extraction patterns.

* * * * *